(12) United States Patent
Zhao et al.

(10) Patent No.: US 11,575,278 B2
(45) Date of Patent: Feb. 7, 2023

(54) MULTI-FUNCTIONAL TRAVEL CHARGER AND CONTROL SYSTEM THEREOF

(71) Applicant: Momax Technology (Shenzhen) Co Ltd, Guangdong (CN)

(72) Inventors: Xia Zhao, Guangdong (CN); John Cheng, Guangdong (CN)

(73) Assignee: Momax Technology (Shenzhen) Co Ltd, Shenzhen (CN)

( * ) Notice: Subject to any disclaimer, the term of this patent is extended or adjusted under 35 U.S.C. 154(b) by 217 days.

(21) Appl. No.: 17/105,744

(22) Filed: Nov. 27, 2020

(65) Prior Publication Data

US 2021/0167630 A1 Jun. 3, 2021

(30) Foreign Application Priority Data

Nov. 29, 2019 (CN) .......................... 201922098850.0

(51) Int. Cl.
*H01M 10/46* (2006.01)
*H02J 50/00* (2016.01)
*H02J 7/00* (2006.01)

(52) U.S. Cl.
CPC .......... *H02J 50/005* (2020.01); *H02J 7/0044* (2013.01)

(58) Field of Classification Search
CPC ...... H02J 7/0044; H02J 7/0042; H02J 7/0013; H02J 7/342; H02J 50/005; H02J 50/10; H02J 50/40; H02J 50/12; H01F 38/14
USPC .......................... 320/107, 108, 114, 115, 138
See application file for complete search history.

(56) References Cited

U.S. PATENT DOCUMENTS

2017/0094392 A1* 3/2017 Zörkendörfer ......... H04R 9/025

FOREIGN PATENT DOCUMENTS

| CN | 208782518 U | * | 4/2019 |
| CN | 208782518 U | | 4/2019 |
| CN | 208806632 U | | 4/2019 |
| CN | 110707787 A | | 1/2020 |

(Continued)

OTHER PUBLICATIONS

Google translation of CN-208782518-U (Year: 2019).*

(Continued)

*Primary Examiner* — Edward Tso

(57) ABSTRACT

A multi-functional travel charger and a control system thereof are disclosed. The charger includes a charger body and a main control module communicated with wireless charging transmitting modules, a top shell and a bottom shell of the charger body are connected in a magnetic attraction/snap-fit manner, and the wireless charging transmitting modules include a mobile phone wireless charging transmitting module and an accessory wireless charging transmitting module. The control system includes a circuit control and charge/discharge management system and wireless charging transmitting modules; the accessory wireless charging transmitting module includes one or more of an earbud wireless charging transmitting module, a watch wireless charging transmitting module, and a stylus wireless charging transmitting module. The present disclosure meets user's requirements for wireless charging and simultaneous charging of multiple electronic devices, and the user does not need to carry multiple charging cables/chargers when going out, increasing convenience when the user goes out.

16 Claims, 12 Drawing Sheets

(56) References Cited

FOREIGN PATENT DOCUMENTS

| JP | 03290723 A | 12/1991 |
| JP | 2012156280 A | 8/2012 |
| JP | 2012517796 A | 8/2012 |
| JP | 2015501124 A | 1/2015 |
| JP | 3206152 U | 8/2016 |
| JP | 2017099259 A | 6/2017 |
| KR | 1020110114703 A | 10/2011 |

OTHER PUBLICATIONS

Extended European Search Report of counterpart European Patent Application No. 20208896.9 dated Feb. 2, 2021.
Office Action of Counterpart Japanese Patent Application No. 2020-196822 dated Nov. 2, 2021.
Office Action of Counterpart Korean Patent Application No. 20-2020-0004342 dated May 26, 2022.

\* cited by examiner

MULTI-FUNCTIONAL TRAVEL CHARGER AND CONTROL SYSTEM THEREOF

CROSS REFERENCE TO RELATED APPLICATIONS

The present claims the benefit of Chinese Patent Application No. 201922098850.0 filed on Nov. 29, 2019. All the above are hereby incorporated by reference. the contents of which are incorporated herein by reference in their entirety.

TECHNICAL FIELD

The present disclosure relates to the technical field of chargers, and in particular, to a multi-functional travel charger and a control system thereof.

BACKGROUND

With the development of science and technology, there are various types of chargers on the market. Most existing chargers implement charging and discharging in a wired manner, which is inconvenient for use. In addition, with the popularization of Apple products, many people are equipped with almost the whole series of Apple products, including iPhone, Apple Watch, iPad, and AirPods, as well as mobile phones, watches, computers, wireless earbuds and the like of other brands. These devices are equipped with different charging cables, and a user needs to carry different charging cables when going out, which causes extreme inconvenience. Besides, a single charger can serve one product at a time, and cannot charge another product until charging of the previous product being finished. This fails to meet people's requirement of charging multiple products at the same time.

It is urgent to develop an improved charger that can at least partly solve the foregoing defect.

SUMMARY

To overcome the defect of the prior art, the present disclosure provides a multi-functional travel charger and a control system thereof.

The technical solution of the present disclosure is as follows:

According to an aspect, a multi-functional travel charger includes a charger body and a main control module disposed in the charger body, the main control module being communicated with wireless charging transmitting modules, wherein the charger body includes a top shell and a bottom shell, the top shell and the bottom shell being connected in a magnetic attraction manner or a snap-fit manner; and the wireless charging transmitting modules include a mobile phone wireless charging transmitting module for charging a mobile phone and an accessory wireless charging transmitting module for charging an accessory, and the accessory wireless charging transmitting module includes one or more of an earbud wireless charging transmitting module, a watch wireless charging transmitting module, and a stylus wireless charging transmitting module.

In some embodiments, a chamber is provided in the top shell/the bottom shell, and the accessory/the accessory wireless charging transmitting module is received in the chamber.

In some embodiments, the accessory includes an earbud case, an earbud case chamber is provided in the top shell and/or the bottom shell, the earbud case is received in the earbud case chamber, and the earbud wireless charging transmitting module is positioned corresponding to the earbud case chamber.

Further, the earbud case chamber includes a large earbud case chamber and a small earbud case chamber, where the large earbud case chamber and the small earbud case chamber overlap with each other.

In some embodiments, the accessory includes a watch, a watch wireless charging chamber is provided in the top shell and/or the bottom shell, a watch wireless charging component is received in the watch wireless charging chamber, and the watch wireless charging component includes the watch wireless charging transmitting module.

Further, a concaved recess is provided on a side surface of the watch wireless charging chamber, a protruding portion is provided on a side surface of the watch wireless charging component, a position of the portion corresponds to the position of the watch wireless charging snap-fit portion such that the protruding portion is received in the concaved recess when the watch wireless charging component is received in the watch wireless charging chamber. The concaved recess provides an access such that the finger of the user may operate the protruding portion to thereby pull the watch wireless charging component out of the watch wireless charging chamber.

Further, the watch wireless charging component further includes a watch wireless charging protective case and a watch wireless charging PCB, the watch wireless charging transmitting module is received in the watch wireless charging protective case, and the watch wireless charging PCB is located between the watch wireless charging protective case and the watch wireless charging transmitting module.

Further, the watch wireless charging component is connected to the charger body in a hinged manner through a rotating component.

Further, the rotating component includes a watch wireless charging rotary shaft, rotary dampers are sleeved on two ends of the watch wireless charging rotary shaft respectively, and the rotary dampers are fixed on the charger body through damper regulators.

In some embodiments, the accessory includes a stylus/stylus pencil/stylus pen, a stylus chamber is provided in the top shell and/or the bottom shell, the stylus is received in the stylus chamber, and the stylus wireless charging transmitting module is positioned corresponding to the stylus chamber.

Further, a magnet is fixed in the stylus chamber, and the stylus is fixed in the stylus chamber by the magnet.

In some embodiments, side surfaces of the top shell and the bottom shell are connected in a hinged manner through a hollow lid.

Further, hollow rotary shafts are disposed on an upper side and a lower side of the hollow lid respectively, the top shell is pivotably connected to the hollow lid in a hinged manner through the hollow rotary shaft, and the bottom shell is pivotably connected to the hollow lid in a hinged manner through the other hollow rotary shaft.

Further, a top shell snap-fit portion is provided on a side surface of the top shell, a bottom shell snap-fit portion is provided on a side surface of the bottom shell, and the top shell snap-fit portion and the bottom shell snap-fit portion are located at a side of the charger body opposite to the hollow lid.

In some embodiments, a top shell magnet is fixed in the top shell, a bottom shell magnet corresponding to a position of the top shell magnet is fixed in the bottom shell, and the top shell magnet and the bottom shell magnet attract each other, so that the top shell and the bottom shell attract each other.

In some embodiments, the top shell includes a top shell upper cover and a top shell lower cover, and the top shell upper cover and the top shell lower cover are connected in a snap-fit manner or connected through a screw.

In some embodiments, the bottom shell includes a bottom shell upper cover and a bottom shell lower cover, and the bottom shell upper cover and the bottom shell lower cover are connected in a snap-fit manner or connected through a screw.

In some embodiments, the main control module is provided with an on/off controller, a charge/discharge port and an indicator lamp.

In some embodiments, the wireless charging transmitting modules each includes a wireless charging transmitting circuit as well as a wireless charging transmitting coil and a wireless charging transmitting magnetic sheet that are connected to the wireless charging transmitting circuit;

the wireless charging transmitting circuits are integrated in the main control module; or the wireless charging transmitting circuit is disposed on a wireless charging transmitting PCB, and the wireless charging transmitting PCB, the wireless charging transmitting coil and the wireless charging transmitting magnetic sheet are fixed at a wireless charging position of the mobile phone or the accessory.

In some embodiments, the mobile phone wireless charging transmitting module includes a first mobile phone wireless charging transmitting module and/or a second mobile phone wireless charging transmitting module, a charging position of the first mobile phone wireless charging transmitting module faces towards an interior of the charger body, and a charging position of the second mobile phone wireless charging transmitting module faces towards the external of the charger body.

Further, a cell/battery is disposed in the charger body, and the cell/battery is electrically connected to the main control module.

In some embodiments, a wireless charging receiving module is further disposed in the charger body, and the wireless charging receiving module is communicated with the main control module.

According to another aspect, a control system of a multifunctional travel charger includes a circuit control and charge/discharge management system and wireless charging transmitting modules connected to the circuit control and charge/discharge management system, the wireless charging transmitting modules include a mobile phone wireless charging transmitting module for charging a mobile phone and an accessory wireless charging transmitting module for charging an accessory, and the accessory wireless charging transmitting module includes one or more of an earbud wireless charging transmitting module, a watch wireless charging transmitting module, and a stylus wireless charging transmitting module.

In some embodiments, wireless charging transmitting circuits corresponding to the wireless charging transmitting modules are integrated in the circuit control and charge/discharge management system; or the wireless charging transmitting circuits corresponding to the wireless charging transmitting modules are disposed in a corresponding wireless charging transmitting system, and the wireless charging transmitting system is electrically connected to the circuit control and charge/discharge management system.

In some embodiments, the mobile phone wireless charging transmitting module includes one mobile phone wireless charging transmitting coil; or the mobile phone wireless charging transmitting module includes two mobile phone wireless charging transmitting coils with different charging directions.

The present disclosure according to the foregoing solution has the following beneficial effects: the charger according to the present disclosure, while charging electronic devices such as a mobile phone, can also charge devices such as earbuds, a band, and a stylus, thereby meeting user's requirements for wireless charging and simultaneous charging of multiple electronic devices, and the user does not need to carry a lot of charging cables/chargers when going out. Moreover, the charger according to the present disclosure can store multiple electronic devices, providing maximum use convenience when the user goes out. The charger of the present disclosure integrates multiple charging areas in the same charger product. The whole product looks beautiful and neat, which conforms to people's aesthetic standard, and enhances portability.

Figure 1:
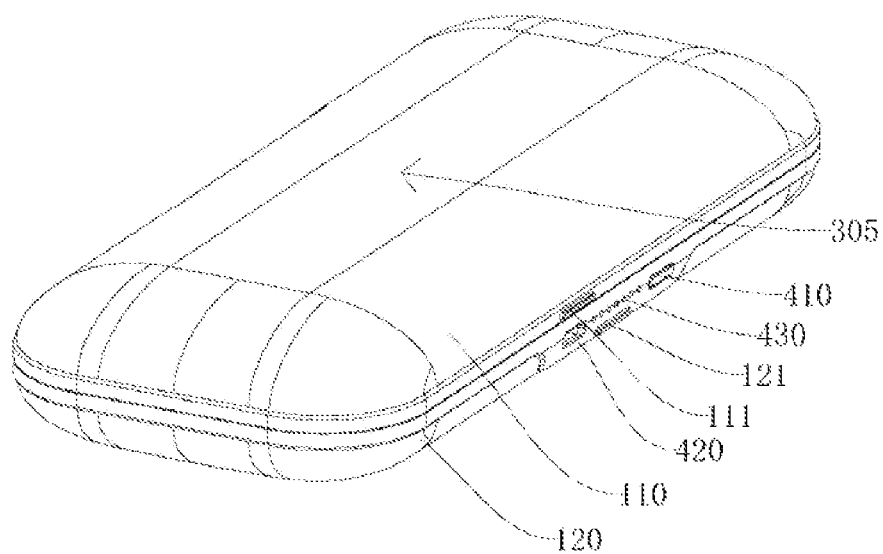
FIG. 1 is a schematic structural diagram of a charger according to an embodiment of the present disclosure.

In the drawings, 110: top shell; 1101: top shell upper cover; 1102: top shell lower cover; 1103: top shell earbud case chamber; 1104: top shell watch wireless charging chamber; 1105: top shell stylus chamber; 111: top shell snap-fit portion; 112: top shell magnet; 113: top shell damper silicone;

120: bottom shell; 1201: bottom shell upper cover; 1202: bottom shell lower cover; 1203: bottom shell earbud case chamber; 1204: bottom shell watch wireless charging chamber; 1205: concaved recess; 1206: bottom shell stylus chamber; 121: bottom shell snap-fit portion; 122: bottom shell magnet; 123: bottom shell damper silicone;

200: connecting member; 210: hollow rotary shaft;

301: first mobile phone wireless charging area; 302: earbud wireless charging area; 303: watch wireless charging area; 304: stylus wireless charging area; 305: second mobile phone wireless charging area;

311: first mobile phone wireless charging transmitting coil; 312: first mobile phone wireless charging transmitting magnetic sheet; 313: second mobile phone wireless charging transmitting coil; 314: second mobile phone wireless charging transmitting magnetic sheet;

321: earbud wireless charging transmitting coil; 322: earbud wireless charging transmitting magnetic sheet;

330: watch wireless charging component; 331: watch wireless charging protective case; 332: watch wireless charging PCB; 333: watch wireless charging transmitting module; 334: watch wireless charging rotary shaft; 335: rotary damper; 336: damper regulator; 337: locking fitting;

341: stylus wireless charging transmitting coil; 342: stylus wireless charging transmitting magnetic sheet;

400: main control module; 410: on/off controller; 420: TYPE-C port; 430: LED indicator lamp;

500: wireless charging receiving module;

600: cell/battery.

DETAILED DESCRIPTION

The present disclosure is described in further detail with reference to the accompanying drawings and implementations.

Figure 9:
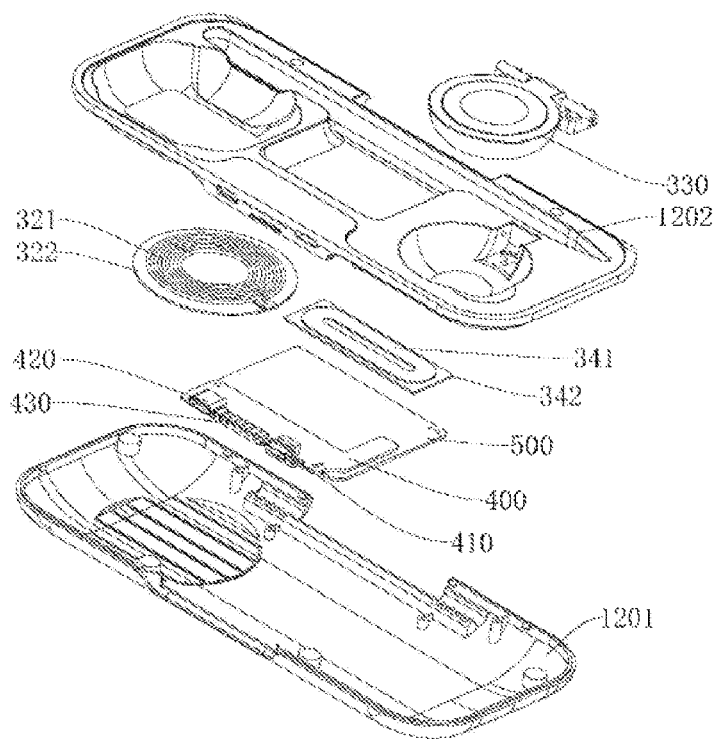
FIG. 9 is an exploded view of the bottom shell.

As shown in FIG. 1 and FIG. 9, a multi-functional travel charger includes a charger body and a main control module 400 disposed in the charger body, and the main control module 400 is communicated with wireless charging transmitting modules. Preferably, the main control module 400 is provided with an on/off controller 410, a charging/discharging port (which is preferably a TYPE-C port 420) and an LED indicator lamp 430, which respectively realizes on/off control of charge/discharge, charge/discharge management, and charge/discharge state display.

As shown in FIG. 1 to FIG. 4, the charger body includes a top shell 110 and a bottom shell 120. The top shell 110 and the bottom shell 120 are connected in a magnetic attraction manner or a snap-fit manner. The top shell 110 and the bottom shell 120 are arranged to open naturally. A top shell magnet 112 is fixed in the top shell 110, a bottom shell magnet 122 corresponding to a position of the top shell magnet 112 is disposed in the bottom shell 120, and the top shell magnet 112 and the bottom shell magnet 122 attract each other, so that the top shell 110 and the bottom shell 120 attract each other. Through attraction between the top shell 110 and the bottom shell 120, the top shell 110 and the bottom shell 120 can open and close conveniently. Moreover, attraction positions of the top shell 110 and the bottom shell 120 are precisely aligned, to ensure tightness of the connection.

Preferably, the top shell 110 includes a top shell upper cover 1101 and a top shell lower cover 1102, where the top shell upper cover 1101 and the top shell lower cover 1102 are connected in a snap-fit manner, connected through a screw, or connected through laser welding. The bottom shell 120 includes a bottom shell upper cover 1201 and a bottom shell lower cover 1202, where the bottom shell upper cover 1201 and the bottom shell lower cover 1202 are connected in a snap-fit manner, connected through a screw, or connected through laser welding. The top shell upper cover 1101 and the top shell lower cover 1102 may be connected in other manners, and the bottom shell upper cover 1201 and the bottom shell lower cover 1202 may be connected in other manners, which are not limited in the present disclosure.

Figure 2:
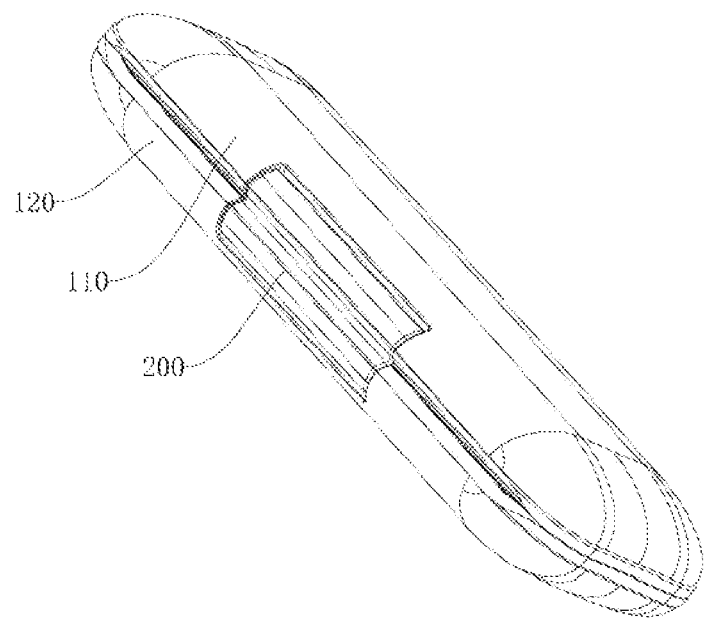
FIG. 2 is a schematic diagram of the charger, viewed from another aspect.
Figure 3:
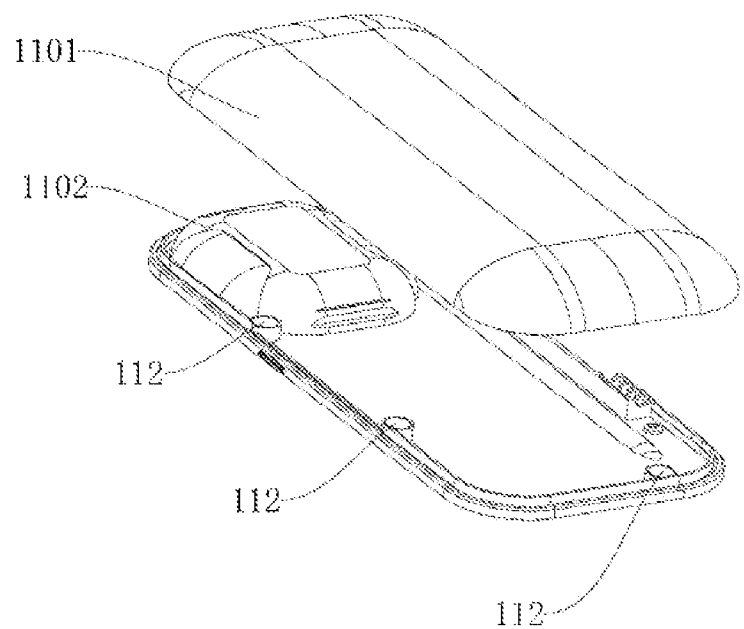
FIG. 3 is a schematic structural diagram of a top shell.
Figure 4:
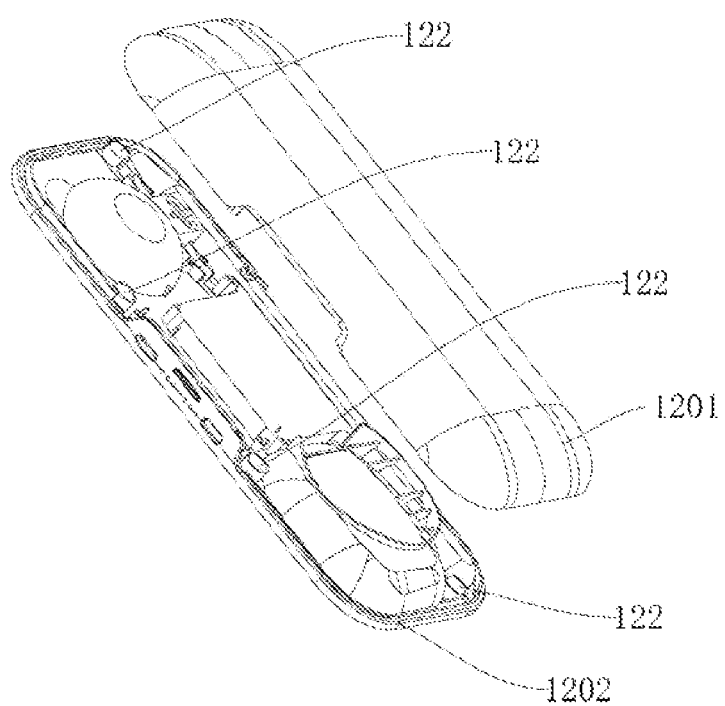
FIG. 4 is a schematic structural diagram of a bottom shell.
Figure 5:
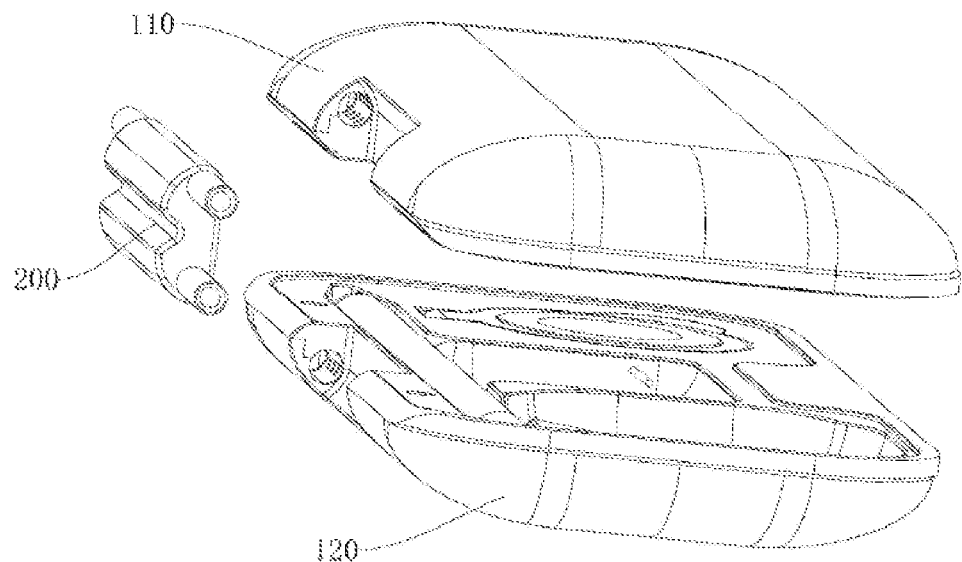
FIG. 5 is an exploded view of the charger, showing a connection between the top shell and the bottom shell.
Figure 6:
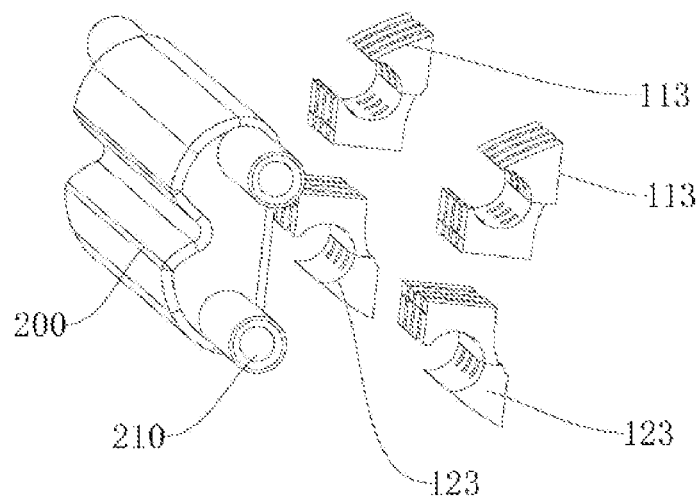
FIG. 6 is an exploded view of a hollow rotary shaft.

As shown in FIG. 2, FIG. 5 and FIG. 6, side surfaces of the top shell 110 and the bottom shell 120 are connected through a connecting member, for example, a hollow lid 200 in a hinged manner, which facilitates wiring in the top shell 110 and the bottom shell 120. Specifically, hollow rotary shafts 210 are disposed at an upper side and a lower side of the hollow lid 200 respectively. The top shell 110 defines holes corresponding to the rotary shafts 210 and is pivotably connected to the hollow lid 200 through the hollow rotary shafts 210 pivotably received in the corresponding holes of the top shell 110, and the bottom shell 120 defines holes corresponding to the rotary shafts 210 and is pivotably connected to the hollow lid 200 through the other hollow rotary shafts 210 pivotably received in the corresponding holes of the bottom shell 120. Because both the top shell 110 and the bottom shell 120 can rotate around the hollow lid 200, the top shell 110 and the bottom shell 120 can rotate relative to each other in a range of a large angle up to 158 degrees.

Specifically, a top shell damper silicone 113 is disposed in the top shell 110, and the top shell damper silicone 113 is sleeved on the hollow rotary shaft 210 that is connected to the top shell 110 in a hinged manner. A bottom shell damper silicone 123 is disposed in the bottom shell 120, and the bottom shell damper silicone 123 is sleeved on the hollow rotary shaft 210 that is connected to the bottom shell 120 in a hinged manner.

In this embodiment, a top shell snap-fit portion 111 is provided on a side surface of the top shell 110, and a bottom shell snap-fit portion 121 is provided on a side surface of the bottom shell 120. The top shell snap-fit portion 111 and the bottom shell snap-fit portion 121 are located on the side of the charger body opposite to the hollow lid 200. By operating the top shell snap-fit portion 111 and the bottom shell snap-fit portion 121, opening and closing of the top shell 110 and the bottom shell 120 are more convenient. Preferably, the position of the top shell snap-fit portion 111 and the position of the bottom shell snap-fit portion 121 are staggered from each other in the left and right direction of the charger, which conforms to the ergonomic design, so that the user can operate more conveniently.

Figure 7:
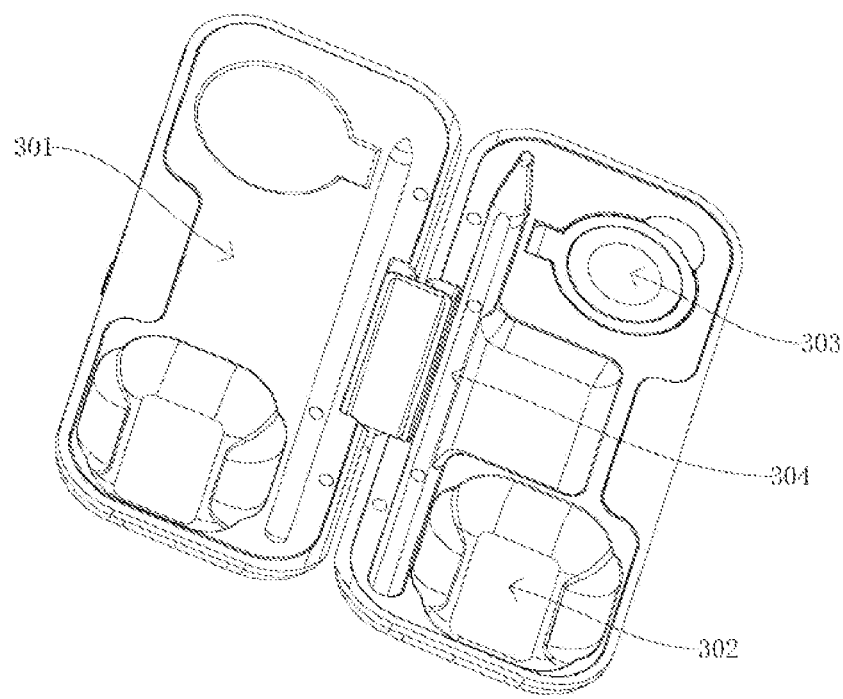
FIG. 7 shows the charger in an open state.
Figure 8:
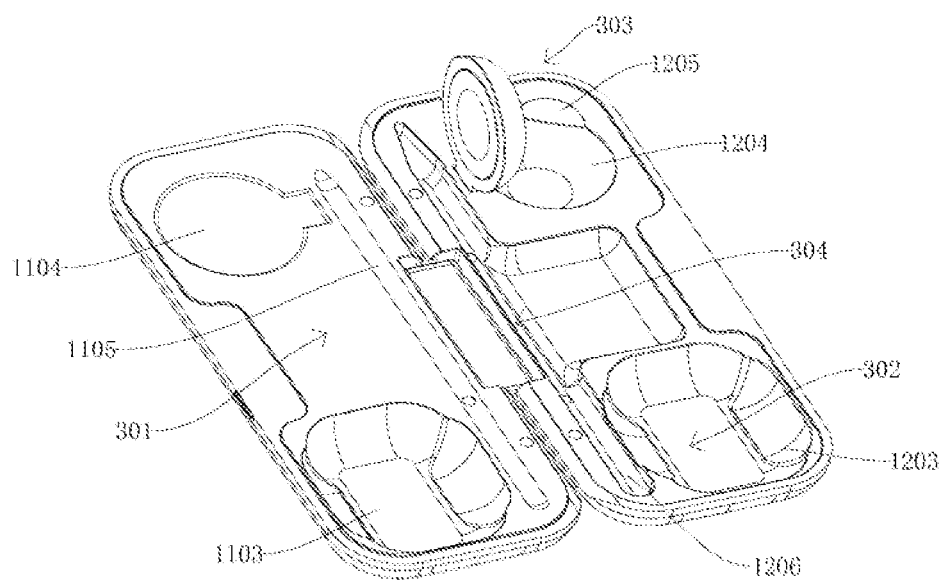
FIG. 8 shows a watch wireless charging component in a set-up state when the charger is in the open state.

As shown in FIG. 7 and FIG. 8, the wireless charging transmitting modules include a mobile phone wireless charging transmitting module for charging a mobile phone and an accessory wireless charging transmitting module for charging an accessory. The accessory includes a mobile phone (or other devices of other wireless charging standards), an earbud case, a watch, and a stylus. The accessory wireless charging transmitting module includes one or more of an earbud wireless charging transmitting module, a watch wireless charging transmitting module 333, and a stylus wireless charging transmitting module.

In this embodiment, the wireless charging transmitting modules include the mobile phone wireless charging transmitting module, the earbud wireless charging transmitting module, the watch wireless charging transmitting module 333, and the stylus wireless charging transmitting module, to realize wireless charging for a mobile phone (or other devices of other wireless charging standards), an earbud case, a watch, and a stylus. Correspondingly, a mobile phone wireless charging area corresponding to the mobile phone (or other devices of other wireless charging standards), an earbud wireless charging area 302 corresponding to the earbud case, a watch wireless charging area 303 corresponding to the watch, and a stylus wireless charging area 304 corresponding to the stylus are provided in the charger body.

Preferably, the mobile phone wireless charging transmitting module includes a first mobile phone wireless charging transmitting module and/or a second mobile phone wireless charging transmitting module. A charging position of the first mobile phone wireless charging transmitting module faces an interior of the charger body; a charging position of the second mobile phone wireless charging transmitting module faces the external of the charger body. In this embodiment, the mobile phone wireless charging transmitting module is disposed in the top shell 110, and includes the first mobile phone wireless charging transmitting module as well as a corresponding first mobile phone wireless charging area 301 and the second mobile phone wireless charging transmitting module as well as a corresponding second mobile phone wireless charging area 305. By setting mobile phone wireless charging transmitting modules with different orientations and positions, charge/discharge management for the mobile phones of different positions is implemented. The first mobile phone wireless charging transmitting module includes a first mobile phone wireless charging transmitting coil 311 and a matching first mobile phone wireless charging transmitting magnetic sheet 312. The second mobile phone wireless charging transmitting module includes a second mobile phone wireless charging transmitting coil 313 and a matching second mobile phone wireless charging transmitting magnetic sheet 314.

A chamber is provided in the top shell 110/bottom shell 120, and the accessory/accessory wireless charging transmitting module are respectively received in the chambers. The present disclosure does not limit the specific positions of the first mobile phone wireless charging area 301, the second mobile phone wireless charging area 305, the earbud wireless charging area 302, the watch wireless charging area 303, and the stylus wireless charging area 304. As long as the design principle of the control system is met, any position replacement of the foregoing charging positions falls within the conception scope of the present disclosure. The following provides description by taking one of the embodiments as an example, but the present disclosure is not limited thereto. Specifically:

(1) As shown in FIG. 7 to FIG. 10, the accessory comprises an earbud case.

An earbud case chamber is provided in the top shell 110 and/or the bottom shell 120, and the earbud case is received in the earbud case chamber. The earbud wireless charging transmitting module is positioned corresponding to the earbud case chamber. The earbud wireless charging module in this embodiment is located in the bottom shell 120, and the earbud wireless charging transmitting module includes an earbud wireless charging transmitting coil 321 and an earbud wireless charging transmitting magnetic sheet 322. A charging position of the earbud wireless charging transmitting coil 321 faces towards the earbud case chamber.

In this embodiment, a top shell earbud case chamber 1103 is provided in the top shell 110, and a bottom shell earbud case chamber 1203 is provided in the bottom shell 120. The earbud case is accommodated in a space cooperatively formed by the top shell earbud case chamber 1103 and the bottom shell earbud case chamber 1203.

Preferably, the earbud case chamber includes a large earbud case chamber and a small earbud case chamber. The large earbud case chamber and the small earbud case chamber overlap each other in a cross shape, so that the earbud case chamber can adapt to two kinds of Apple earbud cases of different sizes.

(2) As shown in FIG. 7 to FIG. 12, the accessory comprises a watch.

A watch wireless charging chamber is provided in the top shell 110 and/or the bottom shell 120, and a watch wireless charging component 330 is received in the watch wireless charging chamber. A top shell watch wireless charging chamber 1104 is provided on the top shell 110, and a bottom shell watch wireless charging chamber 1204 is provided on the bottom shell 120.

The watch wireless charging component 330 includes a watch wireless charging transmitting module 333, and the watch wireless charging transmitting module 333 faces towards the position at which a watch is located. The watch wireless charging component 330 further includes a watch wireless charging protective case 331 and a watch wireless charging PCB 332. The watch wireless charging transmitting module 333 is embedded in the watch wireless charging protective case 331, and the watch wireless charging PCB 332 is located between the watch wireless charging protective case 331 and the watch wireless charging transmitting module 333.

In this embodiment, the watch wireless charging component 330 is connected to the charger body in a hinged manner through a rotating component, and is rotatable relative to the charger body within 90 degrees. Specifically, the rotating component 330 includes a watch wireless charging rotary shaft 334. Rotary dampers 335 are sleeved on two ends of the watch wireless charging rotary shaft 334 respectively, and the rotary dampers 335 are fixed to the charger body through damper regulators 336, so that the watch wireless charging component 330 can maintain stationary after being rotated by an angle, to thereby prevent the watch from interruption due to sliding in a charging process. Preferably, the watch wireless charging component 330 further includes a locking fitting 337, and a locking shaft penetrates through the locking fitting 337 in the up-and-down direction. An upper end of the locking shaft extends into the inner cavity of the watch wireless charging protective case 331, and a lower end thereof extends to a lower side of the watch wireless charging rotary shaft 334.

Preferably, a concaved recess 1205 is provided on a side surface of the watch wireless charging chamber, and a protruding portion is provided on a side surface of the watch wireless charging component 330. A position of the protruding portion corresponds to the position of the watch wireless charging snap-fit portion 1205. The concaved recess 1205 provides an access such that the finger of the user may operate the protruding portion to thereby pull the watch wireless charging component 330 out of the watch wireless charging chamber (3) As shown in FIG. 7 to FIG. 10, the accessory comprises a stylus.

A stylus chamber is provided in the top shell 110 and/or the bottom shell 120, and a stylus is received in the stylus chamber. The stylus wireless charging transmitting module is positioned corresponding to the stylus chamber. A top shell stylus chamber 1105 is provided in the top shell 110, and a bottom shell stylus chamber 1206 is provided in the bottom shell 120. The stylus is accommodated in a space defined by the top shell stylus chamber 1105 and the bottom shell stylus chamber 1206. In this embodiment, the stylus wireless charging transmitting module is disposed in the bottom shell 120, and includes a stylus wireless charging transmitting coil 341 and a matching stylus wireless charging transmitting magnetic sheet 342.

Preferably, a magnet is disposed in the stylus chamber, and the stylus is fixed in the stylus chamber by the attraction force of the magnet, so that the stylus can be firmly maintained at the charging position, to ensure a good charging effect.

Each wireless charging transmitting module includes a wireless charging transmitting circuit as well as a wireless charging transmitting coil and a wireless charging transmitting magnetic sheet that are connected to the wireless charging transmitting circuit. The wireless charging transmitting circuit is integrated in the main control module 400.

Alternatively, the wireless charging transmitting circuit is disposed on a wireless charging transmitting PCB, and the wireless charging transmitting PCB, the wireless charging transmitting coil, and the wireless charging transmitting magnetic sheet are fixed at a wireless charging position of the mobile phone or the accessory. Specifically:

(1) The mobile phone wireless charging transmitting module includes a mobile phone wireless charging transmitting circuit as well as a mobile phone wireless charging transmitting coil and a mobile phone wireless charging transmitting magnetic sheet that are connected to the mobile phone wireless charging transmitting circuit. The mobile phone wireless charging transmitting circuit is integrated in the main control module 400. Alternatively, the mobile phone wireless charging transmitting circuit is disposed on a mobile phone wireless charging transmitting PCB, and the mobile phone wireless charging transmitting PCB, the mobile phone wireless charging transmitting coil, and the mobile phone wireless charging transmitting magnetic sheet are fixed at the wireless charging position of the mobile phone.

(2) The accessory wireless charging transmitting module includes an accessory wireless charging transmitting circuit as well as an accessory wireless charging transmitting coil and an accessory wireless charging transmitting magnetic sheet that are connected to the accessory wireless charging transmitting circuit. The accessory wireless charging transmitting circuit is integrated in the main control module 400. Alternatively, the accessory wireless charging transmitting circuit is disposed on an accessory wireless charging transmitting PCB, and the accessory wireless charging transmitting PCB, the accessory wireless charging transmitting coil, and the accessory wireless charging transmitting magnetic sheet are fixed at the wireless charging position of the accessory.

As shown in FIG. 9, in this embodiment, a wireless charging receiving module 500 is further disposed in the charger body. The wireless charging receiving module 500 is communicated with the main control module 400. The wireless charging receiving module 500 achieves a wireless charging function of the charger, and the wireless charging receiving module 500 in combination with the wired manner of the charge/discharge port makes multiple charging manners of the charger be available.

Figure 10:
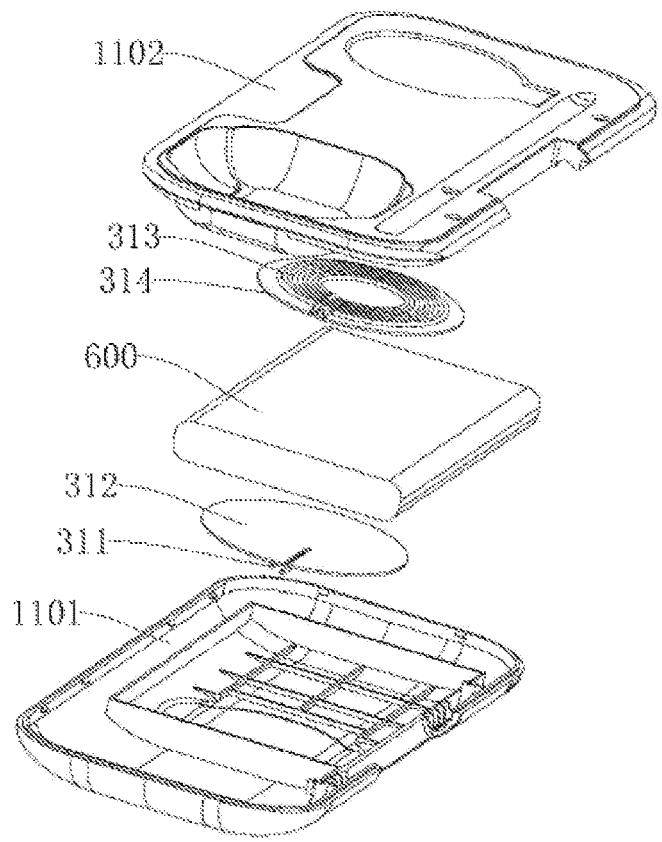
FIG. 10 is an exploded view of the top shell.
Figure 11:
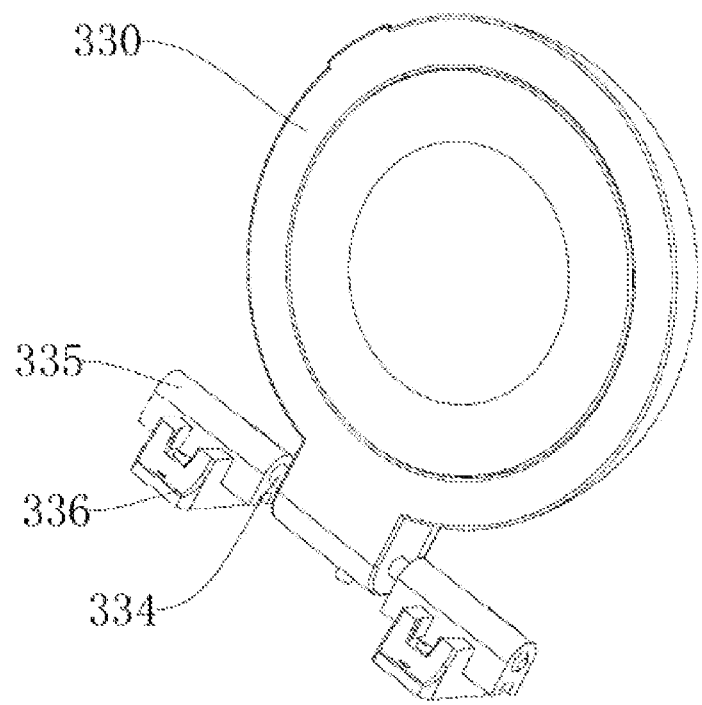
FIG. 11 is a schematic structural diagram of a watch wireless charging transmitting component.
Figure 12:
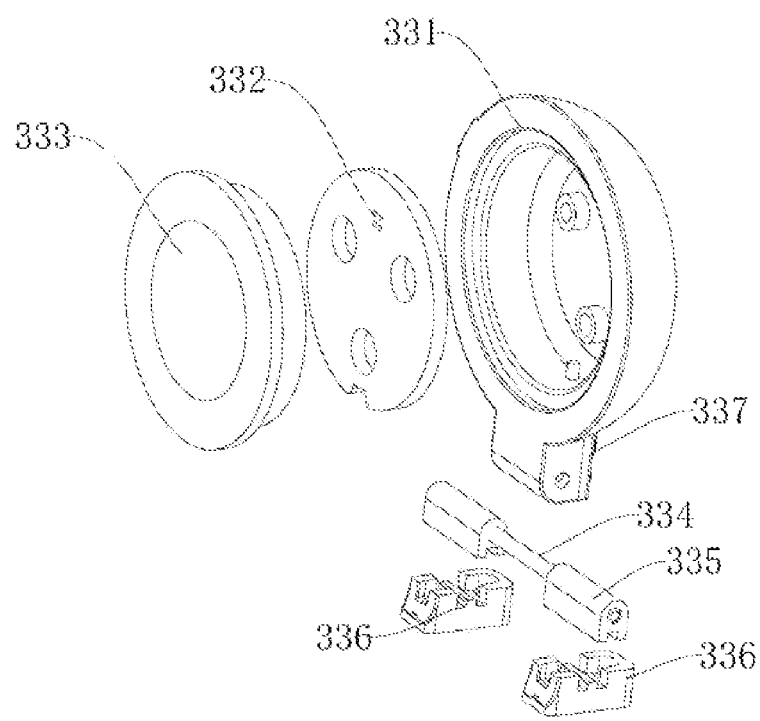
FIG. 12 is an exploded view of the watch wireless charging transmitting component.

As shown in FIG. 10, in this embodiment, a cell/battery 600 is disposed in the charger body, and the cell/battery 600 is electrically connected to the main control module 400. Through charge/discharge management for the cell/battery 600, the electrical storage function control of the charger is implemented. Preferably, the first mobile phone wireless charging transmitting module is located at an inner side of the cell/battery 600, and the second mobile phone wireless charging transmitting module is located at an outer side of the cell/battery 600, thereby saving space inside the charger body.

As shown in FIG. 13 to FIG. 19, a control system of a multi-functional travel charger includes a circuit control and charge/discharge management system and wireless charging transmitting modules communicated with the circuit control and charge/discharge management system.

The circuit control and charge/discharge management system is further communicated with an on/off controller and an LED indicator lamp. The on/off controller is configured to control the circuit and the charge/discharge management system, and the LED indicator lamp is configured to display of a charge/discharge process. The circuit control and charge/discharge management system is further electrically connected to a charge/discharge port through a power supply input/output module, which makes charging for the charger and discharging from the charger to an external device be available.

Preferably, the circuit control and charge/discharge management system is further electrically connected to a polymer cell. By charging the polymer cell, functions of power storage and power supply of the charger are achieved.

The wireless charging transmitting modules include a mobile phone wireless charging transmitting module for charging a mobile phone and an accessory wireless charging transmitting module for charging an accessory. The accessory wireless charging transmitting module includes one or more of an earbud wireless charging transmitting module, a watch wireless charging transmitting module, and a stylus wireless charging transmitting module.

Preferably, wireless charging transmitting circuits corresponding to the wireless charging transmitting modules are integrated in the circuit control and charge/discharge management system. Alternatively, the wireless charging transmitting circuits corresponding to the wireless charging transmitting modules are respectively disposed in the corresponding wireless charging transmitting system, and the wireless charging transmitting system is electrically connected to the circuit control and charge/discharge management system. In the present disclosure, the wireless charging transmitting circuits corresponding to the wireless charging transmitting modules are integrated in the circuit control and charge/discharge management system, so that the internal structure of the charger is more compact.

Figure 13:
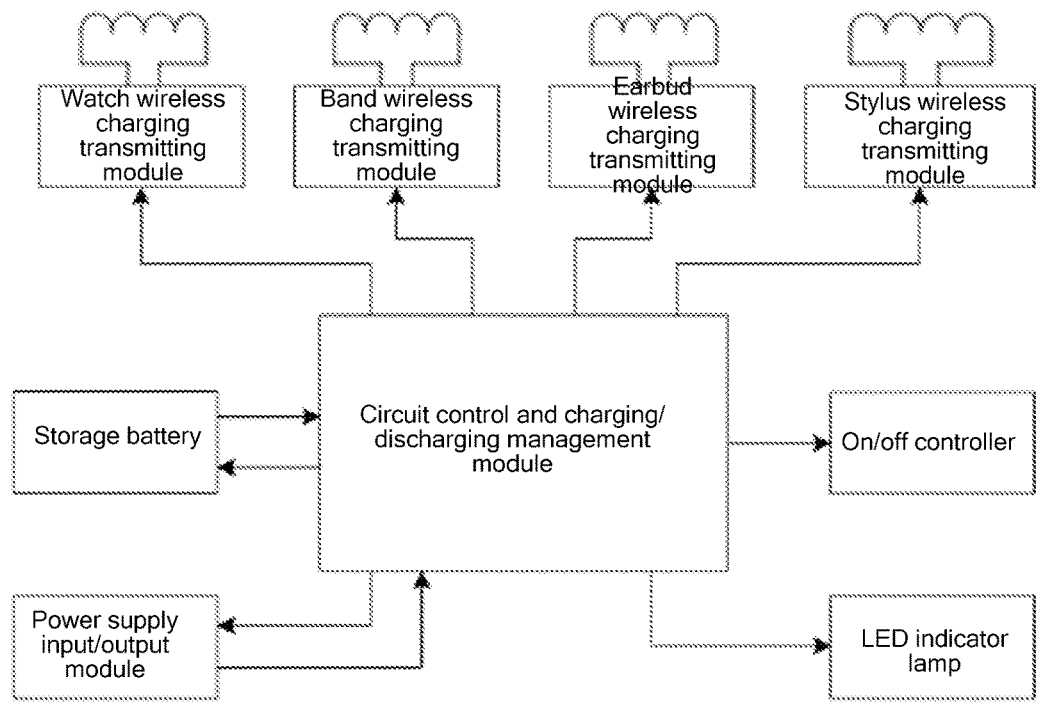
FIG. 13 to FIG. 19 are 1 block diagrams of control systems in different embodiments of the present disclosure.

In the embodiment of the control system of a multi-functional travel charger shown in FIG. 13, the circuit control and charge/discharge management system implements input/output management by using the power supply input/output module only, and there is no wireless charging receiving module. In other embodiments, the power supply input/output module cooperates with the wireless charging receiving module to implement the wired/wireless charging manner.

Figure 14:
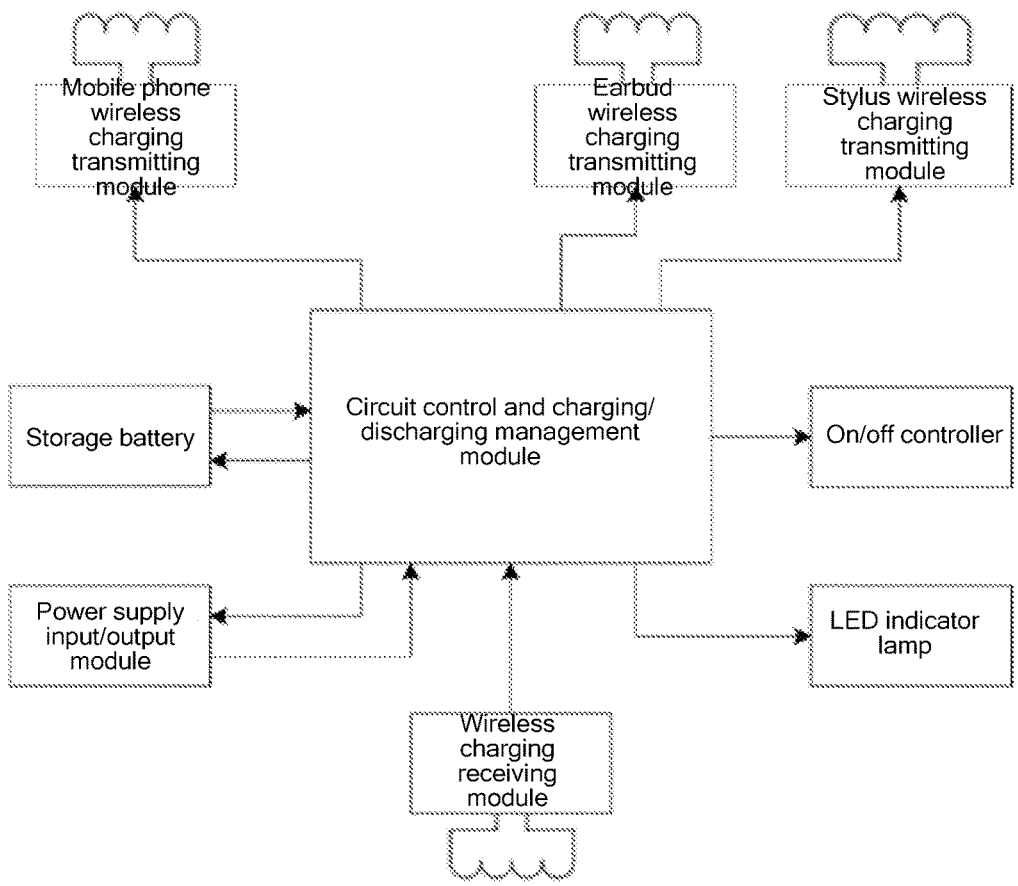

In the embodiment of the control system of a multi-functional travel charger shown in FIG. 14, the wireless charging transmitting modules include a mobile phone wireless charging transmitting module, an earbud wireless charging transmitting module and a stylus wireless charging transmitting module.

Figure 15:
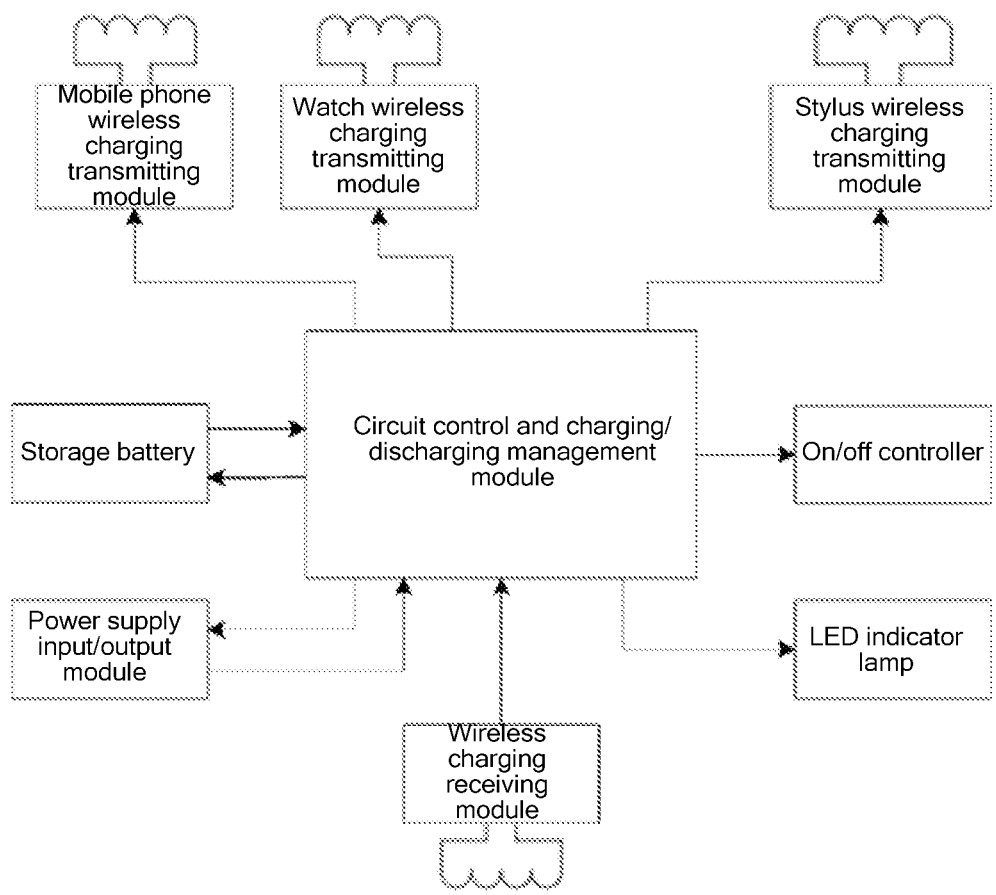

In the embodiment of the control system of a multi-functional travel charger shown in FIG. 15, the wireless charging transmitting modules include a mobile phone wireless charging transmitting module, a watch wireless charging transmitting module, and a stylus wireless charging transmitting module.

Figure 16:
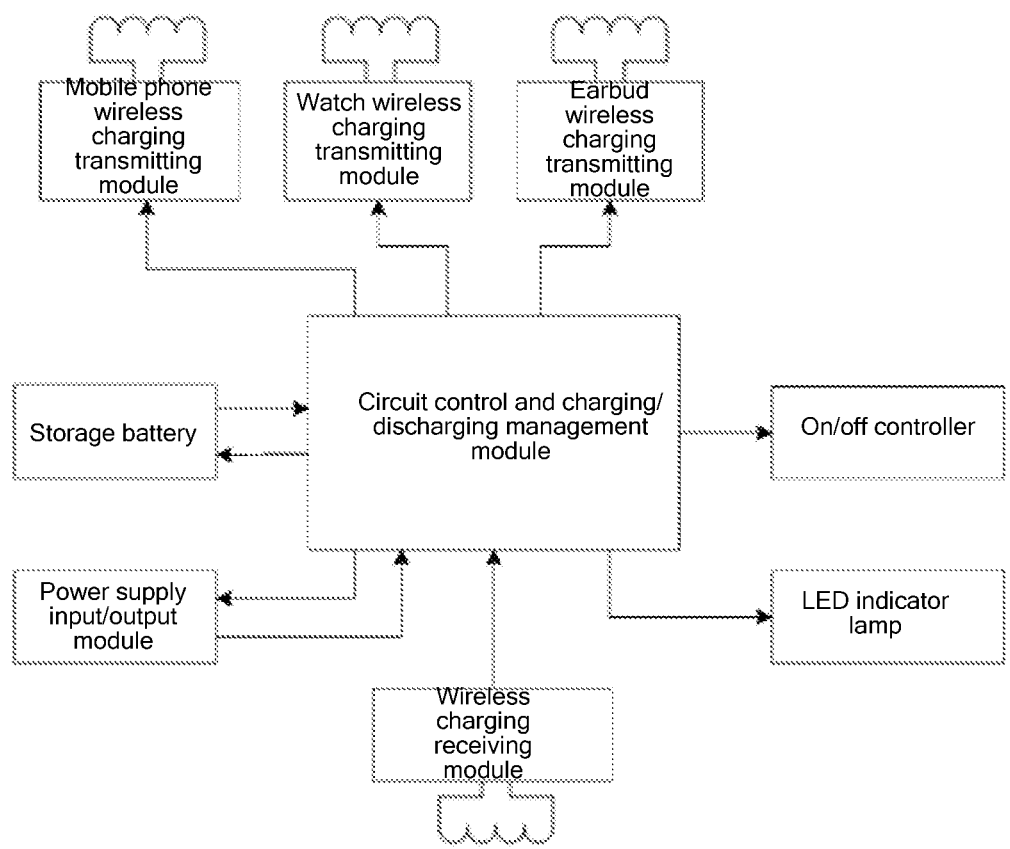

In the embodiment of the control system of a multi-functional travel charger shown in FIG. 16, the wireless charging transmitting modules include a mobile phone wireless charging transmitting module, a watch wireless charging transmitting module, and an earbud wireless charging transmitting module.

Figure 17:
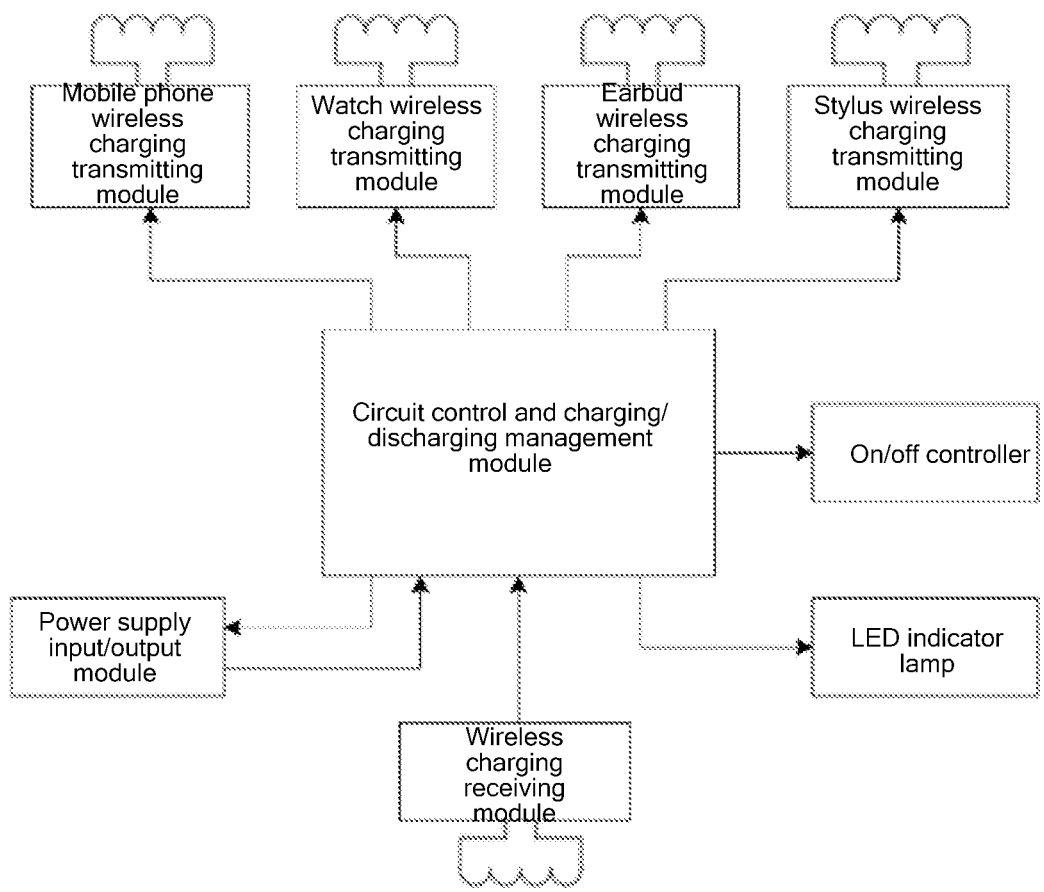

In the embodiment of the control system of a multi-functional travel charger shown in FIG. 17, the circuit control and charge/discharge management system has no power storage function, and the charger only has the function of charging when electrically connected to the mains supply.

Figure 18:
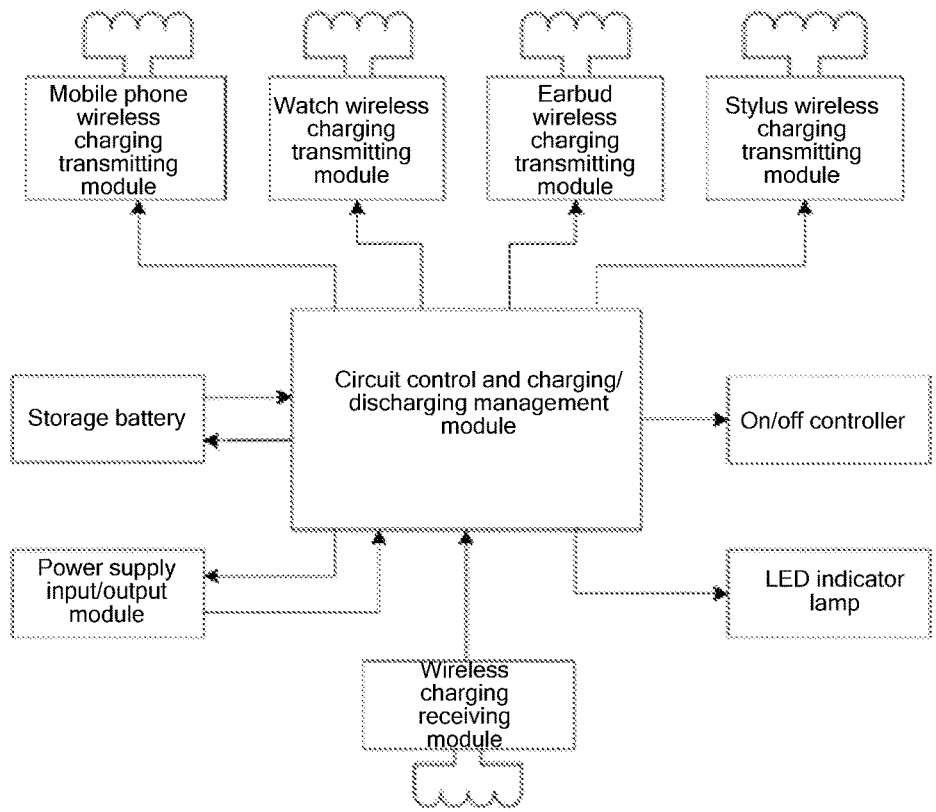
Figure 19:
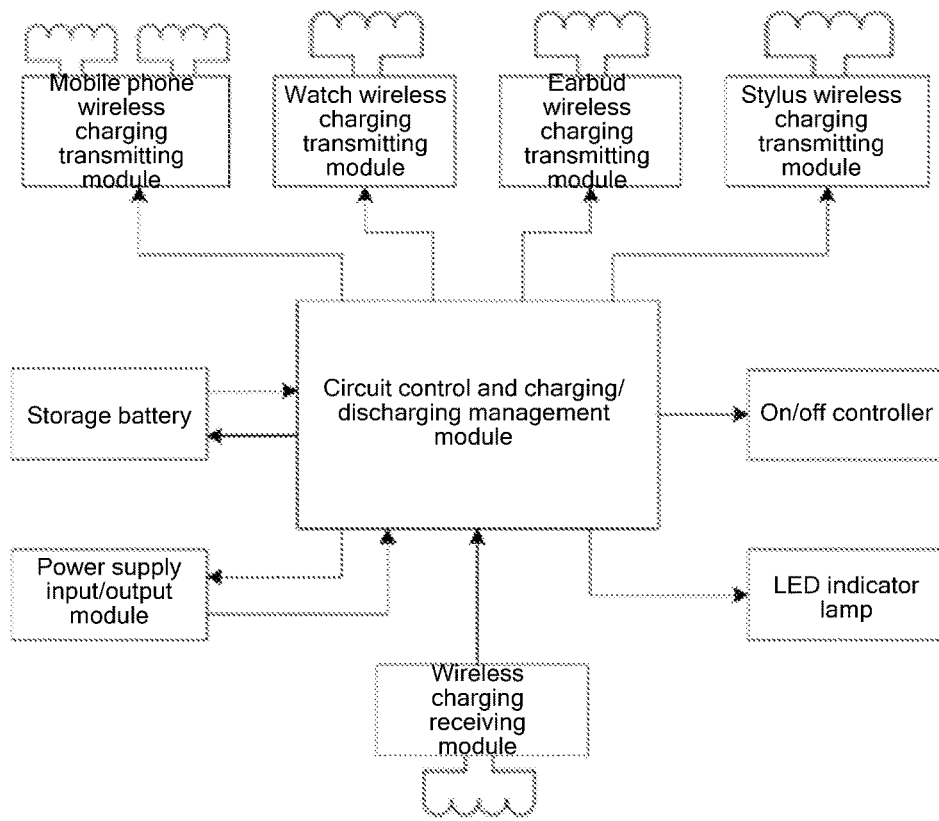

As shown in FIG. 18 and FIG. 19, the mobile phone wireless charging transmitting module includes one mobile phone wireless charging transmitting coil or two mobile phone wireless charging transmitting coils with different charging directions. In this embodiment, the mobile phone wireless charging transmitting module includes two mobile phone charging transmitting coils, so that the charger can charge the mobile phone in either an open state or a closed state.

The foregoing embodiments are merely some embodiments of the present disclosure. It should be noted that all solution variations performed based on the concept of the present disclosure belong to the protection scope of the present application.

Figure 20:
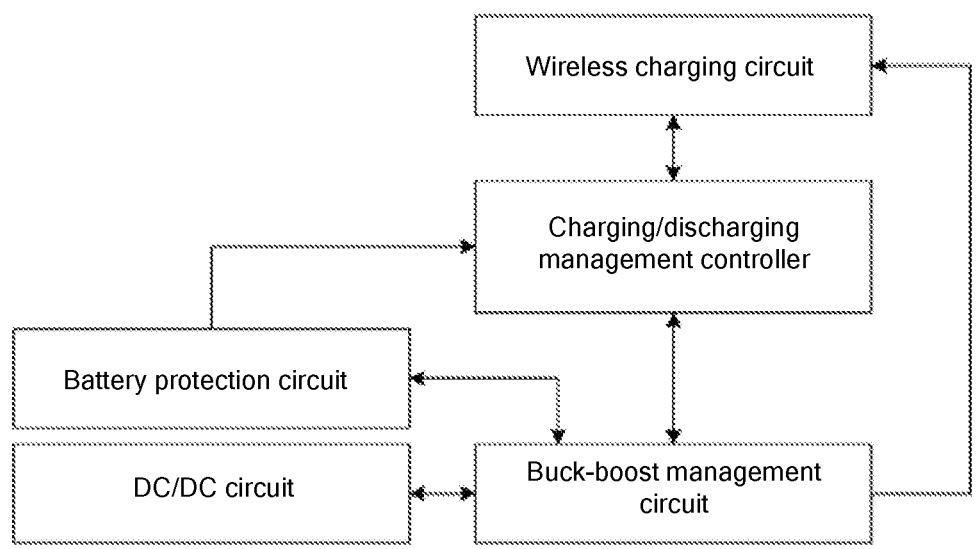
FIG. 20 is a block diagram of a circuit control and charge/discharge management system according to the present disclosure.

As shown in FIG. 20, the circuit control and charge/discharge management system includes a charge/discharge management controller, a wireless charging circuit, a buck-boost management circuit, and a DC/DC circuit. The charge/discharge management circuit is electrically connected to the wireless charging circuit and the buck-boost management circuit bidirectionally, the buck-boost management circuit is electrically connected to the wireless charging circuit, and the buck-boost management circuit is electrically connected to the DC/DC circuit bidirectionally. The charge/discharge management circuit achieves charging control of the wireless charging transmitting modules through the wireless charging circuit.

Preferably, the circuit control and charge/discharge management system further includes a battery protection circuit. The battery protection circuit is electrically connected to the buck-boost management circuit bidirectionally, and the battery protection circuit is electrically connected to the charge/discharge management circuit. The battery protection circuit is configured to detect the buck-boost management circuit and thereby protect the charge/discharge management circuit.

The foregoing circuits can be implemented by using common control circuits in the technical field, which are not limited in the present disclosure. Therefore, the specific structures of the circuits are not described here.

It should be understood that, those of ordinary skill in the art may make improvements or modifications according to the foregoing description, and all such improvements and modifications shall belong to the protection scope of the appended claims of the present disclosure.

The present disclosure is illustrated above with reference to the accompanying drawings. Apparently, implementation of the present disclosure is not limited to the foregoing manners. All improvements made by using the method conception and technical solutions of the present disclosure or direct application of the conception and technical solutions of the present disclosure to other scenarios without improvement shall fall within the protection scope of the present disclosure.

What is claimed is:

1. A multi-functional travel charger, comprising a charger body and a main control module disposed in the charger body, the main control module being communicated with wireless charging transmitting modules, wherein
the charger body comprises a top shell and a bottom shell being connected in a magnetic attraction manner or a snap-fit manner; and
the wireless charging transmitting modules comprise a mobile phone wireless charging transmitting module configured for charging a mobile phone and an accessory wireless charging transmitting module configured for charging an accessory, and the accessory wireless charging transmitting module comprises one or more of an earbud wireless charging transmitting module, a watch wireless charging transmitting module, and a stylus wireless charging transmitting module; an earbud case chamber is provided in the top shell for receiving an earbud case, and the earbud wireless charging transmitting module is positioned corresponding to the earbud case chamber.

2. The multi-functional travel charger according to claim 1, wherein a watch wireless charging chamber is provided in the top shell, a watch wireless charging component is received in the watch wireless charging chamber, and the watch wireless charging component comprises the watch wireless charging transmitting module.

3. The multi-functional travel charger according to claim 2, wherein the watch wireless charging component further includes a watch wireless charging protective case and a watch wireless charging PCB, the watch wireless charging transmitting module is received in the watch wireless charging protective case with the watch wireless charging PCB located between the watch wireless charging protective case and the watch wireless charging transmitting module.

4. The multi-functional travel charger according to claim 2, wherein the watch wireless charging component is pivotably connected to the charger body.

5. The multi-functional travel charger according to claim 1, wherein, a stylus chamber is provided in the top shell and/or the bottom shell for receiving a stylus, and the stylus wireless charging transmitting module is positioned corresponding to the stylus chamber.

6. The multi-functional travel charger according to claim 1, wherein the wireless charging transmitting modules each comprises a wireless charging transmitting circuit as well as a wireless charging transmitting coil and a wireless charging transmitting magnetic sheet that are connected to the wireless charging transmitting circuit.

7. The multi-functional travel charger according to claim 6, wherein the wireless charging transmitting circuit is integrated in the main control module; or
the wireless charging transmitting circuit is disposed on a wireless charging transmitting PCB, and the wireless charging transmitting PCB, the wireless charging transmitting coil and the wireless charging transmitting magnetic sheet are fixed at a wireless charging position of the mobile phone or the accessory.

8. The multi-functional travel charger according to claim 1, wherein the mobile phone wireless charging transmitting module comprises a first mobile phone wireless charging transmitting module and/or a second mobile phone wireless charging transmitting module, a charging position of the first mobile phone wireless charging transmitting module faces towards an interior of the charger body, and a charging position of the second mobile phone wireless charging transmitting module faces towards the external of the charger body.

9. The multi-functional travel charger according to claim 1, wherein a wireless charging receiving module is further disposed in the charger body, and the wireless charging receiving module is communicated with the main control module.

10. The multi-functional travel charger according to claim 1, wherein the top shell and the bottom shell are pivotably connected to each other via a connecting member which comprises a hollow rotary shaft pivotably connected to the top shell and another hollow rotary shaft pivotably connected to the bottom shell.

11. The multi-functional travel charger according to claim 1, wherein a watch wireless charging chamber is provided in the bottom shell, a watch wireless charging component is received in the watch wireless charging chamber, and the watch wireless charging component comprises the watch wireless charging transmitting module.

12. The multi-functional travel charger according to claim 1, wherein a watch wireless charging chamber is provided in the top shell and the bottom shell, a watch wireless charging component is received in the watch wireless charging chamber, and the watch wireless charging component comprises the watch wireless charging transmitting module.

13. A multi-functional travel charger, comprising a charger body and a main control module disposed in the charger body, the main control module being communicated with wireless charging transmitting modules, wherein
the charger body comprises a top shell and a bottom shell being connected in a magnetic attraction manner or a snap-fit manner; and
the wireless charging transmitting modules comprise a mobile phone wireless charging transmitting module configured for charging a mobile phone and an accessory wireless charging transmitting module configured for charging an accessory, and the accessory wireless charging transmitting module comprises one or more of an earbud wireless charging transmitting module, a watch wireless charging transmitting module, and a stylus wireless charging transmitting module; an earbud case chamber is provided in the bottom shell for receiving an earbud case, and the earbud wireless charging transmitting module is positioned corresponding to the earbud case chamber.

14. A control system of a multi-functional travel charger, comprising a circuit control and charge/discharge management system and wireless charging transmitting modules communicated with the circuit control and charge/discharge management system, wherein the wireless charging transmitting modules comprise a mobile phone wireless charging transmitting module configured for charging a mobile phone and an accessory wireless charging transmitting module configured for charging an accessory, and the accessory wireless charging transmitting module comprises one or more of an earbud wireless charging transmitting module, a watch wireless charging transmitting module, and a stylus wireless charging transmitting module; the multi-functional travel charger comprises a charger body having a top shell and a bottom shell; an earbud case chamber is provided in the top shell for receiving an earbud case, and the earbud wireless charging transmitting module is positioned corresponding to the earbud case chamber.

15. The control system of a multi-functional travel charger according to claim 14, wherein wireless charging transmitting circuits corresponding to the wireless charging transmitting modules are integrated in the circuit control and charge/discharge management system; or
the wireless charging transmitting circuits corresponding to the wireless charging transmitting modules are disposed in a corresponding wireless charging transmitting system, and the wireless charging transmitting system is electrically connected to the circuit control and charge/discharge management system.

16. The control system of a multi-functional travel charger according to claim 14, wherein the mobile phone wireless charging transmitting module comprises one mobile phone wireless charging transmitting coil; or
the mobile phone wireless charging transmitting module comprises two mobile phone wireless charging transmitting coils with different charging directions.

\* \* \* \* \*